United States Patent
Falkenberg (10) Patent No.: US 11,023,263 B2
(45) Date of Patent: *Jun. 1, 2021

(54) HYBRID SERVER-SIDE AND CLIENT-SIDE PORTAL AGGREGATION AND RENDERING

(71) Applicant: International Business Machines Corporation, Armonk, NY (US)

(72) Inventor: Matthias Falkenberg, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,785

(22) Filed: Jun. 17, 2019

(65) Prior Publication Data

US 2019/0303179 A1    Oct. 3, 2019

Related U.S. Application Data

(63) Continuation of application No. 15/803,856, filed on Nov. 6, 2017, now Pat. No. 10,324,737, which is a (Continued)

(30) Foreign Application Priority Data

Oct. 30, 2012    (GB) ........................ 1219441

(51) Int. Cl.
*G06F 9/451*    (2018.01)
*G06F 9/4401*   (2018.01)
(Continued)

(52) U.S. Cl.
CPC ............ *G06F 9/451* (2018.02); *G06F 9/4401* (2013.01); *G06F 11/3612* (2013.01);
(Continued)

(58) Field of Classification Search
CPC .... G06F 9/451; G06F 9/4401; G06F 11/3612; G06F 40/14; G06F 2201/875; H04M 3/242; H04L 67/1029; H04L 67/22
(Continued)

(56) References Cited

U.S. PATENT DOCUMENTS 7,624,160 B2    11/2009    Henderson et al.
8,131,706 B2    3/2012     Altrichter et al.
(Continued)

FOREIGN PATENT DOCUMENTS

GB    2507483 A        10/2012
WO    2010141465 A1    12/2010

OTHER PUBLICATIONS

GB Appl. No. 1219441.1, Search Report, dated Mar. 13, 2013, 1 pg.
(Continued)

*Primary Examiner* — Thu V Huynh
(74) *Attorney, Agent, or Firm* — Cuenot, Forsythe & Kim, LLC (57) ABSTRACT

Rendering of a portal page that is displayable on a client system includes receiving a request for a portal page by a web portal engine, monitoring server-side aggregation and rendering performance by the web portal engine, and comparing a measured performance parameter value of the server-side aggregation and rendering against a pre-defined threshold value. The server-side aggregation and rendering is interrupted, based upon the comparison, once the threshold value is exceeded. Further, an intermediate result of the portal page is prepared based on the server-side aggregation and rendering for sending, such that a client-side processing completes the interrupted aggregation and rendering of the portal page.

20 Claims, 6 Drawing Sheets

Related U.S. Application Data continuation of application No. 14/064,469, filed on Oct. 28, 2013, now Pat. No. 9,811,351.

(51) Int. Cl.
  *G06F 11/36* (2006.01)
  *G06F 40/14* (2020.01)
  *G06F 16/958* (2019.01)

(52) U.S. Cl.
  CPC ............ *G06F 16/958* (2019.01); *G06F 40/14* (2020.01); *G06F 2201/875* (2013.01)

(58) Field of Classification Search
  USPC ........................................................ 715/234
  See application file for complete search history.

(56) References Cited

U.S. PATENT DOCUMENTS

| | | | |
|---|---|---|---|
| 8,181,112 | B2 | 5/2012 | Jolley et al. |
| 8,271,949 | B2 | 9/2012 | Bernardini |
| 9,811,351 | B2 | 11/2017 | Falkenberg |
| 10,324,737 | B2 | 6/2019 | Falkenberg |
| 2002/0038456 | A1 | 3/2002 | Hansen et al. |
| 2003/0187982 | A1 | 10/2003 | Petit |
| 2005/0015718 | A1 | 1/2005 | Sambhus et al. |
| 2005/0187978 | A1 | 8/2005 | Qian et al. |
| 2007/0061700 | A1 | 3/2007 | Kothari et al. |
| 2007/0083793 | A1 | 4/2007 | Roth |
| 2007/0192701 | A1 | 8/2007 | Joines et al. |
| 2008/0002677 | A1* | 1/2008 | Bugenhagen ....... H04L 12/1428 370/356 |
| 2008/0049630 | A1* | 2/2008 | Kozisek .............. H04L 41/0823 370/250 |
| 2009/0265199 | A1 | 10/2009 | Moerdier |
| 2009/0298473 | A1 | 12/2009 | Choi et al. |
| 2010/0070984 | A1 | 3/2010 | Hadar |
| 2011/0282905 | A1 | 11/2011 | Polis et al. |
| 2012/0143942 | A1 | 6/2012 | Chhabra et al. |
| 2014/0122999 | A1 | 5/2014 | Falkenberg |
| 2018/0060090 | A1 | 3/2018 | Falkenberg |

OTHER PUBLICATIONS

U.S. Appl. No. 14/064,469, Non-Final Office Action, dated Sep. 11, 2015, 10 pg.

U.S. Appl. No. 14/064,469, Final Office Action, dated Feb. 26, 2016, 12 pg.

U.S. Appl. No. 14/064,469, Non-Final Office Action, dated Dec. 1, 2016, 12 pg.

U.S. Appl. No. 14/064,469, Final Office Action, dated Feb. 7, 2017, 14 pg.

U.S. Appl. No. 14/064,469, Notice of Allowance, dated Jun. 30, 2017, 9 pg.

U.S. Appl. No. 15/803,856, Non-Final Office Action, dated Jul. 25, 2018, 31 pg.

U.S. Appl. No. 15/803,856, Notice of Allowance, dated Feb. 6, 2019, 8 pg.

* cited by examiner

100 method for aggregation and rendering

102 receiving a request for a portal page by a web portal engine

104 monitoring server-side aggregation and rendering performance

106 comparing a measured performance parameter value with a threshold value

108 interrupting the server-side aggregation and rendering

110 preparing an intermediate result of the portal page

112 client-side processing may complete the interrupted aggregation and rendering

HYBRID SERVER-SIDE AND CLIENT-SIDE PORTAL AGGREGATION AND RENDERING

This application claims the benefit of United Kingdom Application Number 1219441.1 filed on Oct. 30, 2012, which is fully incorporated herein by reference.

BACKGROUND

Portals, in particular web portals, are a common way to access information in the age of the Internet and cloud computing. Portals can provide access to information networks and/or sets of services through the World Wide Web and other computer networks. Often portals provide a single point of access to data and applications. A portal can present a unified and personalized view of information to users. In many implementations, portal applications can include web application views designed as a portal. Portals are capable of presenting data of multiple sources like web applications in a single web interface or browser. In addition to regular web content that may appear in a portal, portals provide the ability to display portlets (self-contained applications or content) in the browser user interface. Portals can also support multiple pages with menu-based or custom navigation for accessing the individualized content and portlets for each page. An individual portal view may be specified by a portal configuration. The portal configuration can include a portal definition such as a file including Extensible Markup Language (XML), portlet definition files for any portlets associated with the portal, java server pages (JSPs), web application descriptors, images such as graphics interchange format files (GIFs), deployment descriptors, configuration files, the Java archive (JAR) files that contain logic and formatting instructions for the portal application, and any other files necessary for a desired portal application.

Speed of information display after requesting through, e.g., a click on an icon is one of a series of key user requirements. Service-level agreements (SLA) formally define the quality of such a portal service. Amongst others, an SLA can set a performance target for web portals. In particular, an SLA can refer to the mean delivery time of pages or parts thereof of a web portal.

Web portal servers usually operate in one of two distinct rendering modes:

(1) Server-side aggregation (SSA) mode: The server performs the aggregation of all mark-up fragments that amount to a web portal page. Afterwards, the complete page is sent to the client in response to a previous request.

(2) Client-side aggregation (CSA) mode: The client performs the aggregation of all mark-up fragments that amount to a web portal page. In response to a client request, the server delivers mark-up that enables the client to load the mark-up fragments that are necessary to complete the web portal page.

Each of the above modes has advantages but also brings along certain disadvantages. For example, the number of requests required to render a web portal page in SSA mode is reduced to a minimum, whereas the CSA mode can result in a large number of single requests because of reloading mark-up fragments one by one. On the other hand, the SSA mode can cause higher initial response times than the CSA mode, because the page aggregation must be completed on the server before it responds to a client request.

Figure 2:
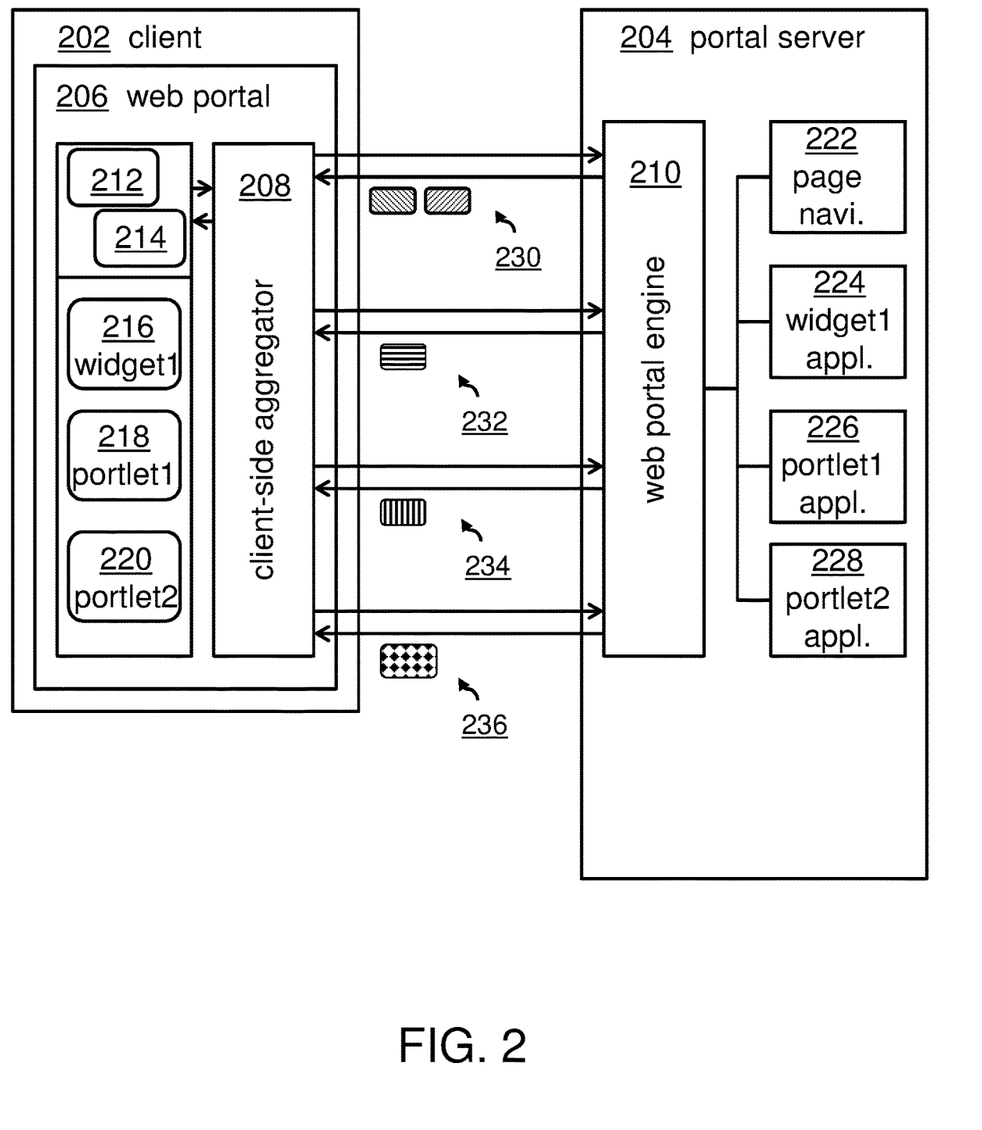
FIG. 2 shows a block diagram a state of the art client-side aggregation and rendering.

FIG. 2 shows rendering and aggregation in a client (CSA) according to the state of the art. A web client 202 and a web portal server are in communicative contact to each other. On the client-side, a web portal 206, enabled by a client-side aggregator 208, enables displaying of information. On the server-side, a web portal engine 210 provides access to the information. The information may come from a widget1 application 224, a portlet1 application 226, or a portlet2 application 228. A page navigation application 222 may be implemented for accessing ordinary web-pages and navigating through them.

On the client side, different pages or fragments 212, 214, may be displayed along with widget1 216, portlet1 218, and portlet2, 220. Reference numerals 230, 232, 234, 236 refer each to an information request from the client-side aggregator 208 to the web portal engine 210 and a response of the web portal engine 210 to the client-side aggregator 208. The information elements are shown as small boxes with different filling patterns. The client-side aggregator 208 aggregates all these information elements and renders them for display in the web portal 206 of the web client 202.

A similar diagram may be drawn for SSA. In that case, a combined already aggregated portal page combining all information elements would be sent over from the web portal engine 210 to the web portal 206. A client-side aggregator 208 would not be necessary because not any client side aggregation would be required.

However, in today's high performance computing environment, a compliance with defined delivery times of services becomes more and more common. Available solutions do not allow, or have only limited capabilities, to work according to SLAs (service level agreement). Thus, there is a need for information and application performance management according to predefined SLAs in the portal.

BRIEF SUMMARY

A method for a rendering of a portal page wherein the portal page is displayable on a client system includes receiving a request for a portal page by a web portal engine, monitoring server-side aggregation and rendering performance by the web portal engine, and comparing, using a processor, a measured performance parameter value of the server-side aggregation and rendering against a pre-defined threshold value. The method further includes interrupting, based on the comparison, the server-side aggregation and rendering once the threshold value is exceeded and preparing an intermediate result of the portal page based on the server-side aggregation and rendering for sending, such that a client-side processing completes the interrupted aggregation and rendering of the portal page.

A system for a rendering of a portal page wherein the portal page is displayable on a client system includes a processor programmed to initiate executable operations. The executable operations include receiving a request for a portal page by a web portal engine, monitoring server-side aggregation and rendering performance by the web portal engine, and comparing a measured performance parameter value of the server-side aggregation and rendering against a pre-defined threshold value. The executable operations further include interrupting, based on the comparison, the server-side aggregation and rendering once the threshold value is exceeded and preparing an intermediate result of the portal page based on the server-side aggregation and rendering for sending, such that a client-side processing completes the interrupted aggregation and rendering of the portal page.

A computer program product for a rendering of a portal page wherein the portal page is displayable on a client system includes a computer readable storage medium having program code stored thereon. The program code is executable by a processor to perform a method including receiving, using the processor, a request for a portal page by a web portal engine, monitoring, using the processor, server-side aggregation and rendering performance by the web portal engine, and comparing, using the processor, a measured performance parameter value of the server-side aggregation and rendering against a pre-defined threshold value. The method further may include interrupting, based on the comparison and using the processor, the server-side aggregation and rendering once the threshold value is exceeded and preparing, using the processor, an intermediate result of the portal page based on the server-side aggregation and rendering for sending, such that a client-side processing completes the interrupted aggregation and rendering of the portal page.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

This disclosure relates generally to a rendering of a portal page. The disclosure further relates to a system for rendering of a portal page, a computing system, a data processing program, and a computer program product.

It may be noted that the threshold value may be defined according to time-based values, SLA policies, individually definable rules, etc.

It may also be noted that a differentiation may be made between the measured performance parameter and its value.

Another notable element may be that the SLAs may be definable per accessed web-page, widget, portlet, or any other information object identifiable by a key, e.g., an URL (universal resource locator).

In the context of this description, the following conventions, terms and/or expressions may be used:

A 'web portal page' or simply 'portal page' may denote an access tool to access different kind of information and applications via a client system from network resources. A tool to display a portal page may be a web browser. However, a portal may also be embedded into other applications.

The term 'request' may denote a request for information, typically identified by a 'link' on a portal page. A request may be initiated by a 'click' on a displayed symbol associated with the 'link'.

The term 'web portal engine' may denote a server-side application adapted for aggregation and potentially also rendering information collected or aggregated from different sources according to an incoming request from a web client.

The term 'aggregation and rendering' may denote a process of collecting information from network resources as well as organizing the information objects and/or fragments according to a configuration reflecting display screen characteristics.

The term 'performance parameter' may denote a parameter that may be instrumental in controlling SLAs. If a measured value of a value corresponding to the performance parameter may reach or exceed a certain pre-defined value, it may be concluded that a rule may have been broken or violated.

The term 'intermediate result' may denote an aggregation and rendering result that may not be complete according to an earlier request. The result may be seen as incomplete, but may be completed at a later point in time and/or at a different place.

The term 'client-side' activities may denote activities that may be performed on a client in a client server network environment. Accordingly, the term 'server-side' may denote activities that may be performed on a server in a client server network environment.

The term 'placeholder' may denote a symbol in a mark-up language that may be replaced by the mark-up language code at a later point in time or at a different computing unit.

The term 'microformat' may denote a language construct of a mark-up language, e.g., XML (Extensible Mark-up Language). A microformat may be implemented as an extension to XML to convey metadata and displayable data from a server to a client system. Although the content of web-pages is technically already capable of 'automated processing', and has been since the inception of the web, such processing is difficult because the traditional mark-up tags used to display information on the web do not describe what the information means. Microformats may bridge this gap by attaching semantics. The use, adoption and processing of microformats may enable, e.g., data items to be indexed, searched for, saved, cross-referenced or structured, so that information can be reused or combined.

The term 'class of portal pages' may denote a group of portal pages that have a common element, e.g., have the same origin or have parts of a URL, e.g., the beginning in common.

The term 'web portal theme' may denote a design of the web-page. It may be in such a way to coordinate all the elements that go into making the web-page so that they complement one another and reinforce a site's subject matter. When a web-page theme works well, it may present a consistent aesthetic view to a viewer, keeping his interest and may give him a clear impression about the website's contents. When downloading a web site template, it may usually be built around a certain theme or web site purpose.

The term 'portlet' may denote pluggable user interface software components that are managed and displayed in a web portal. Portlets may produce fragments of mark-up code that are aggregated into a portal. Typically, following a desktop metaphor, a portal page is displayed as a collection of non-overlapping portlet windows, where each portlet window displays a portlet. Hence, a portlet (or collection of portlets) resembles a web-based application that is hosted in a portal.

The term 'widget' or 'software widget' may denote a generic type of software application comprising portable code intended for one or more different software platforms. The term often implies that either the application, user interface, or both, are 'light-weight', meaning relatively simple and easy to use, as exemplified by a desk accessory or applet, as opposed to a more complete software package such as a spreadsheet or word processor.

The proposed method(s) of rendering of a portal page may offer a couple of advantages:

Firstly, portal administrators no longer have to decide upfront for CSA or SSA. Both, aggregation and rendering modes may be performed in parallel in the interest of an optimized performance of information and service delivery in a web portal. The method for rendering a portal page, as described herein may operate according to pre-defined SLA and performance target. According to the involved rules, based on a request by the client, the server begins composing a web portal page in response. The server may continue until a violation of a rule may be imminent. Once the server may determine a potential violation, the processing of the request is interrupted on the server-side. The response mark-up that may have been created thus far may still lack the output of applications such as the web portal theme, portlets, widgets, and so forth. The server may augment the response mark-up with client-side code, e.g., JavaScript code to reload the missing pieces. The preliminary or incomplete response may be delivered to the client. Upon receiving the response, the client may start rendering the web portal page and the user may perceive the web portal as one that operates according to the performance targets or SLAs. While the user may view the page and may process the displayed information, the client-side aggregator may continue to complement the page with the mark-up fragments that the server had to skip from the server-side aggregation process. Overall, this may shorten the time between a 'click' for information request on the client side and the perceived displaying of the web portal page as requested.

Also the page based SLA rules free the portal administrator to care about time consuming details but concentrate on the important tasks such as overall performance goals.

Last but not least, the combination of SLA policies and the proposed hybrid aggregation and rendering mode may reduce the number of requests to the web portal server and ensuring overall performance targets.

According to one embodiment of the method, the measured performance parameter value and the threshold value may be time-based values. Alternative implementations may imply alternative parameters. However, having a time-based value may be a feasible way to control SLAs and performance targets relatively easy.

According to one embodiment of the method, the intermediate result may comprise already aggregated and rendered portions of the portal page. The intermediate result may also comprise at least one placeholder for non-aggregated and/or non-rendered elements of the portal page, wherein the placeholder is interpretable by a client-side aggregator and rendering engine. This may enable a partial processing of aggregation and rendering at different places, e.g., server-side and client-side processing for a complete aggregation and rendering in response to a request.

According to one embodiment of the method, the placeholder may be based on mark-up language elements representing a microformat or microformats comprising at least an information object out of the group consisting of: a location of missing mark-up fragments in the portal page, and an identification of an application that needs to contribute its content for aggregation and rendering on the client side. Thus, all information required for a final aggregation and rendering of a requested portal page may be available. The remaining client-side aggregation may relate to not only one missing information object but to a plurality.

According to one embodiment of the method, the interrupting may additionally be based on a pre-defined transmission parameter value such that the interrupting occurs already after a value equivalent to the threshold value minus the pre-defined transmission parameter value, wherein a performance parameter value count starts with a beginning of the server-side aggregation and rendering of the requested portal page. This procedure and calculation method may imply that seen from a client perspective, time-based performance target in displaying a portal page may be met, even if a transmission time has to be reflected. The transmission parameter value may also be calculated dynamically, such that for a low transmission time the server-side web portal engine may have more time for aggregation and rendering compared to a long transmission time. This way, differences for different client network connections may be neutralized and the maximum time may be used on the server-side for aggregation and rendering using a typically higher computing performance of a server compared to a client.

According to a further embodiment of the method, the threshold value may be retrievable from a policy repository using an identifier of a portal page as access key. This means that the threshold value may be definable per URL. Certain URL may be given priority in displaying in the portal page compared to information related to another URL. Thus, performance targets and SLAs may be defined based on the origin, the type of information provided etc., of the requested information.

According to one embodiment of the method, several threshold values may belong to a class of portal pages. A class of portal pages may have a common characteristic. One characteristic may be an identical part of the URL, e.g., the beginning of the URL. This may, e.g., be a top level domain name representative of a company name. For an administrator this opens a wide range of performance optimization and management options. The several threshold values may be identical in value such hat only one value per class is required.

According to again one other embodiment of the method, the server-side aggregation and rendering may include at least one out of the group consisting of a web portal theme, a portlet, and a widget. On the other side, all other information objects and metadata may also be aggregated and rendered on the server-side. However, this architecture element allows also a complete aggregation and rendering on the server-side if the threshold may not be reached and all aggregation and rendering may be performed on the server-side.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for rendering of a portal page is given. Afterwards, further embodiments of the system for rendering of a portal page will be described.

Figure 1:
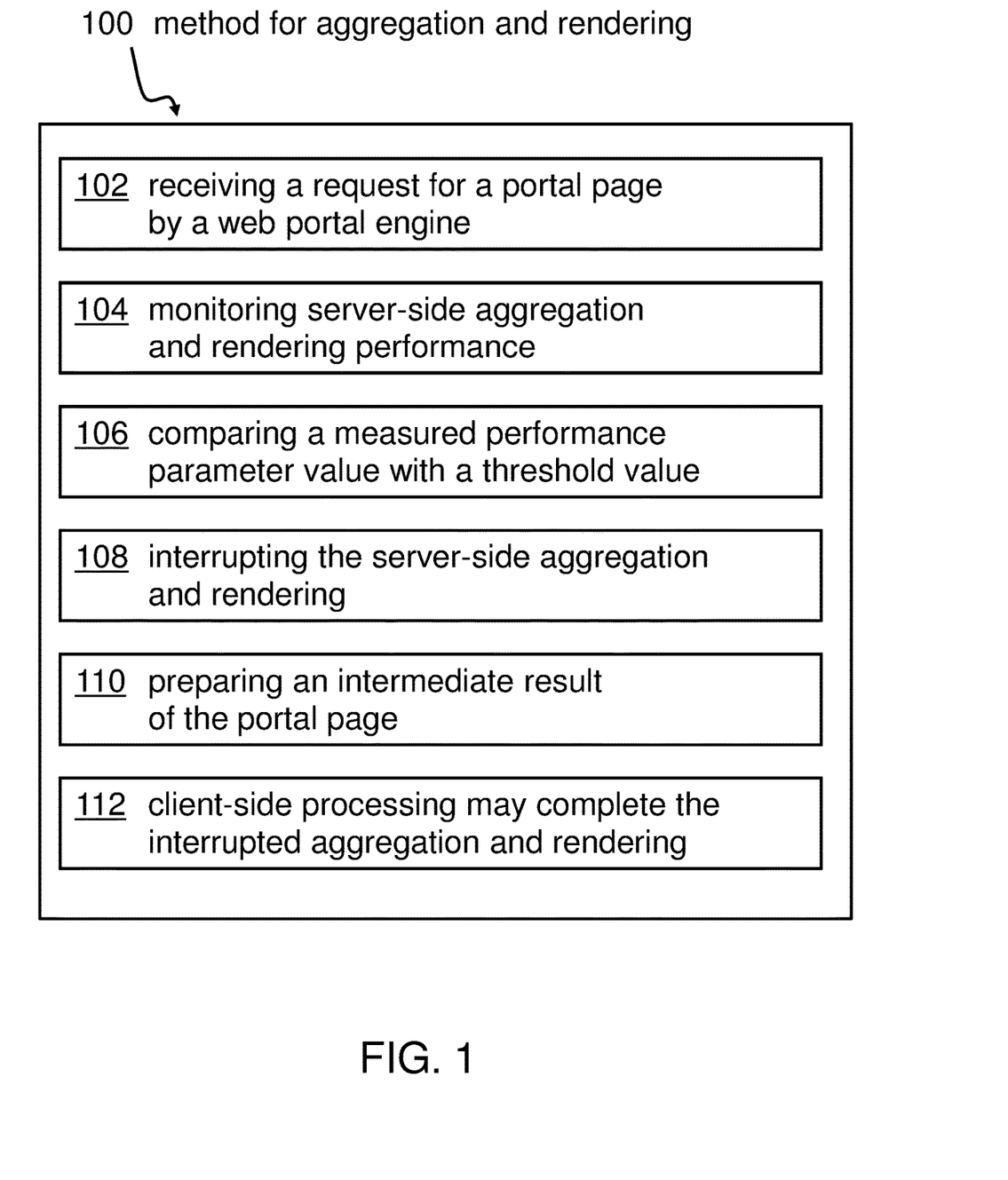
FIG. 1 shows a block diagram of an embodiment of the inventive method for rendering a portal page.

FIG. 1 shows a block diagram of an embodiment of the inventive method 100 for rendering a portal page. The portal page may be displayable on a client system. The method may comprise receiving, 102, a request for a portal page by a web portal engine and monitoring, 104, server-side aggregation and rendering performance by the web portal engine. The method may further comprise comparing, 106, a measured performance parameter value of the server-side aggregation and rendering against a pre-defined threshold value and interrupting, 108, based on the comparison, the server-side aggregation and rendering once the threshold value is exceeded. Finally, the method may comprise preparing, 110, an intermediate result of the portal page based on the server-side aggregation and rendering for sending, such that a client-side processing may complete, 112, the interrupted aggregation and rendering of the portal page. This way a SSA and CSA can be operated in a hybrid mode.

FIG. 2 shows a block diagram of a state-of-the-art client-side aggregation and rendering. As already described above, a client-side aggregator 208 collaborates with a web portal engine 210 on the portal server-side, 204. Each element to be displayed in the web portal 206 will be transferred individually from the web portal engine 210 to the web client-side aggregator 208 as indicated by reference numerals 230, 232, 234, 238. Each element to be displayed in the web portal 206 is shown with a different pattern. The arrows, reaching from the client-side aggregator 208 to the web portal engine 210 and back, symbolize a lot of network traffic between the client 202 and the portal server 204. This may cause a lot of overhead and it is in general extremely difficult to comply with SLAs.

Figure 3:
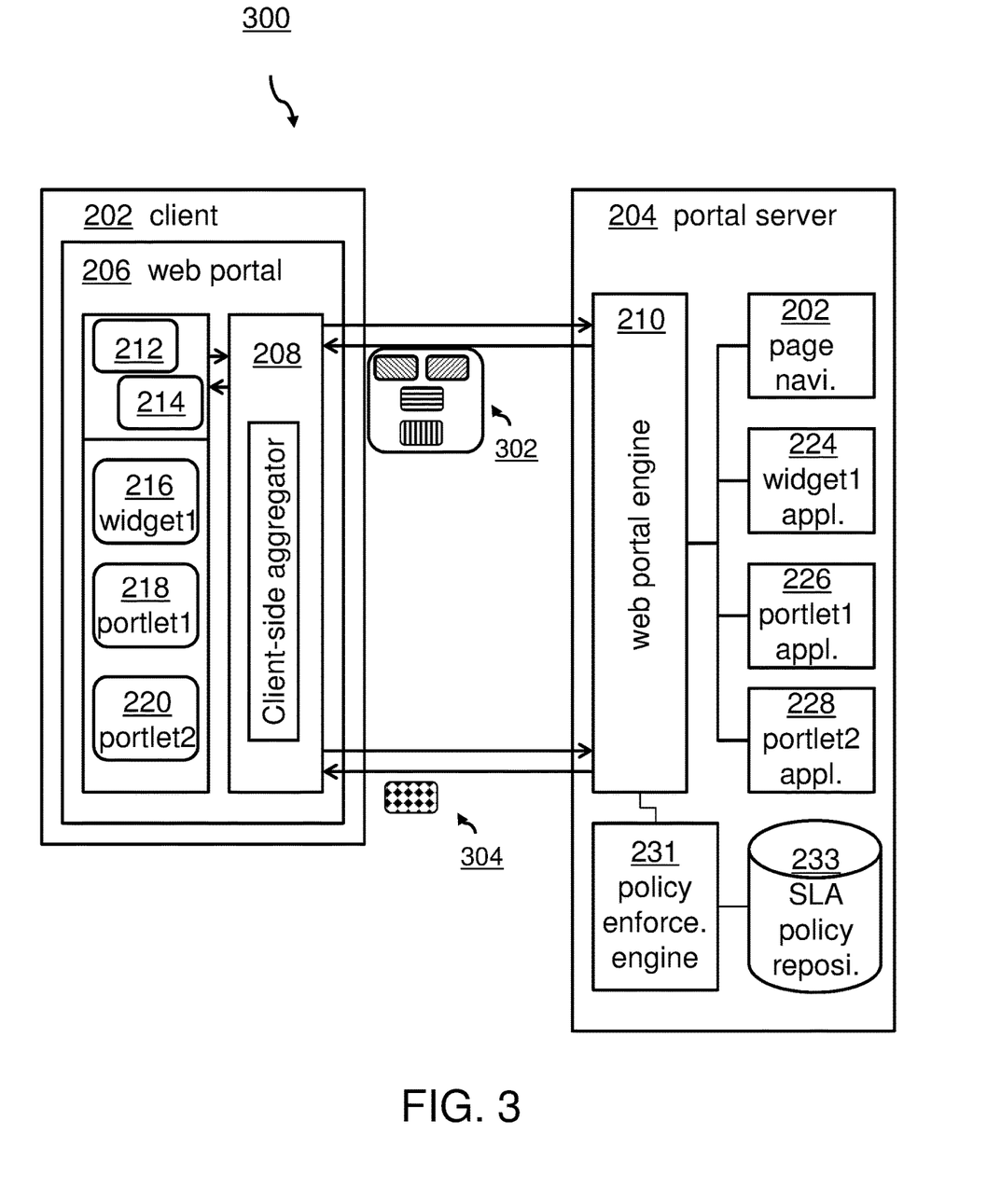
FIG. 3 shows an exemplary block diagram of systems for performing the method for rendering a portal page.

FIG. 3 shows an exemplary block diagram 300 of systems for performing the method for rendering a portal page. Only those figurative elements different to those figurative elements of FIG. 2 have different or new reference numerals. Because of a much lower amount of information request from the client-side aggregator and delivery of the number of information objects from the web portal engine 210, much less arrows are shown between the client-side aggregator 208 and the web portal engine 210. An almost complete aggregated and rendered part of a portal page 302 may be sent from the web portal engine 210 to the client-side aggregator 208. In this case, it may comprise mark-up elements from web-page navigator 202 (two elements), widget1 application 224 and portlet1 application 226, which may deliver information services. Only information object from portlet2 application 228 may not be included in the partial complete portal page 302. This partially completed web-page 302 may have been aggregated and rendered by the web portal engine 210. Because of a defined SLA and after exceeding a threshold according to this SLA, the incomplete web-page 302 may be transferred to the client-side aggregator 208 to be displayed immediately. However, one or more information objects may still be missing. In this case, it is one information object or fragment 304 from portlet2 application 228. The client-side aggregator 208 may detect the missing information in the incomplete portal page 302 and may request the missing information object or mark-up from the web portal engine 210 as indicated by an arrow related to reference numeral 304. In response to this request, the web portal engine may transmit the missing information from portlet2 application 228 to the client-side aggregator 208 for rendering and displaying in the web portal 206.

Additionally, FIG. 3 shows a policy enforcement engine 231 connected to the web portal engine 210, and an SLA policy repository 233 connected to the policy enforcement engine 231. These two additional elements compared to the state-of-the-art technology may allow for a guaranteed delivery respectively display time of portal content which will be described now.

An example of rules stored in the SLA policy repository 233 it may, e.g., be required that 'page1' identifiable by a specific address should be delivered in less than 1 second, 'page2' with the least possible delay, enforcing pure client-side rendering, and 'page5' should be delivered and displayed in less than 5 seconds. These times may also include transmission parameter value.

Figure 4:
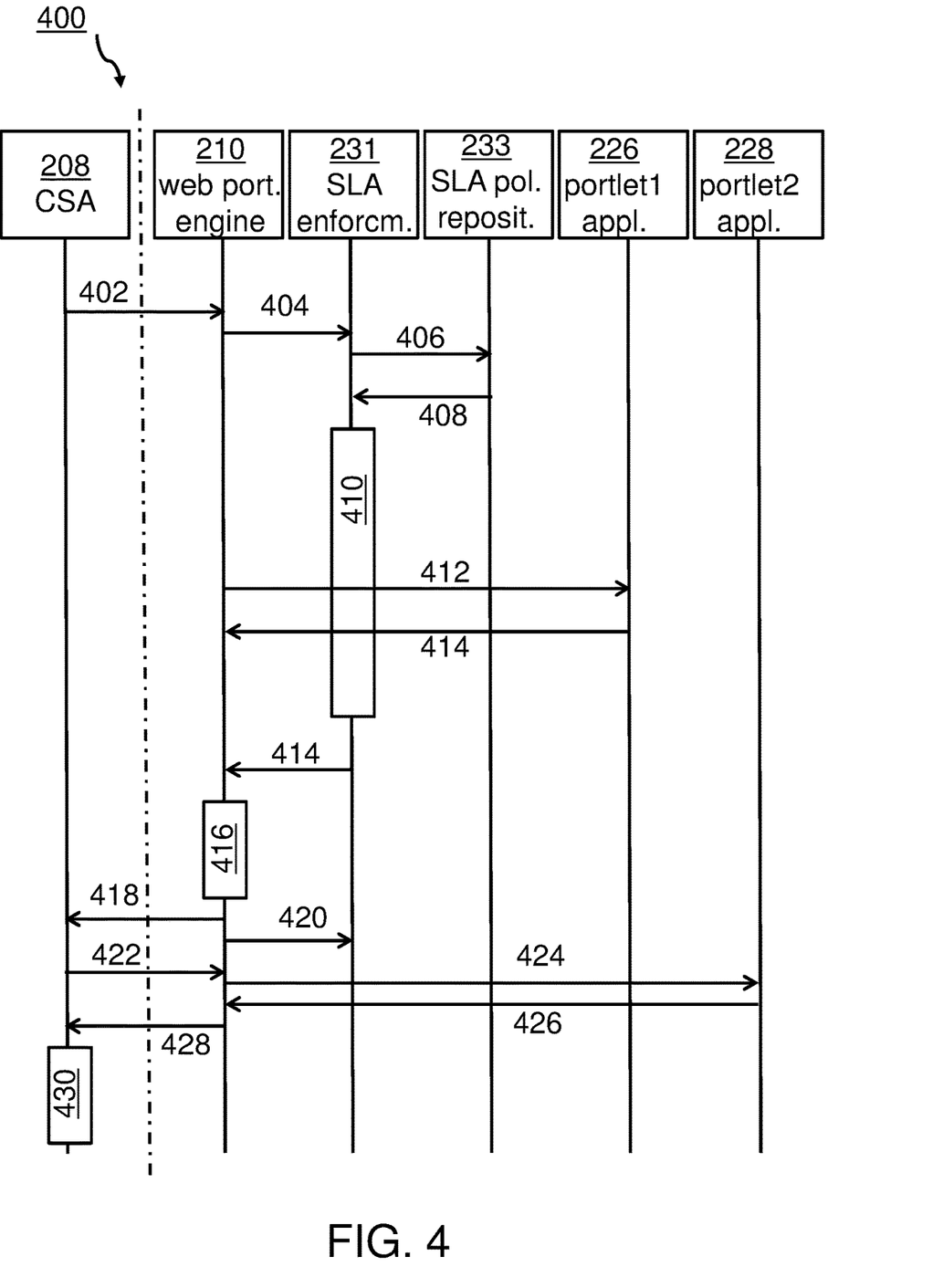
FIG. 4 shows a state diagram of elements involved in performing the method for rendering a portal page.

FIG. 4 shows a state diagram 400 of elements involved in performing the method for rendering a portal page. The client side may be represented by a client-side aggregator 208. Elements on the server-side comprise the web portal engine 210, the SLA enforcement engine 230, the SLA policy repository 233, the portlet1 application 226 and the portlet2 application 228. Different to the example as discussed in relationship to FIG. 3, here, a situation will be described in which information objects are requested and delivery by and from portlet1 application 226 causing a timeout or a violation of an SLA or exceeding of a threshold before also the requested information objects from portlet2 application 228 may be delivered for aggregation and rendering by the web portal engine 210.

Initially, the client-side aggregator 208 may request, 402, e.g., web-page2 from the web portal engine 210. This request may also be passed, 404, to the SLA policy enforcement engine 231. In line with characteristic elements of web-page2, e.g., the URL, the SLA policy enforcement engine 231 requests, 406, one or more policies or SLA rules from the SLA policy repository 233. The SLA policy repository 233 responds, 408, to this request 404 by providing a delivery time policy to the SLA policy enforcement engine 231. The SLA policy enforcement engine 231 identifies one or more rules for requested web-page2 and may start monitoring, 410, in particular monitoring of one or more threshold parameters and related threshold values that may have been delivered together with or as part of a delivery time policy from the SLA policy repository 233. In parallel, the web portal engine 210 may request, 412, application markup information from portlet1 application 226. Portlet1 application 226 may respond with a requested mark-up of portlet1 application 226. During this process, an imminent violation of a timing rule, e.g., exceeding a time threshold may be detected by the SLA policy enforcement engine 231. This may trigger, 414, an interrupt to the web portal engine 210. Responsive to this interrupt, the web portal engine 210 may assemble, 416, already aggregated information objects for requested web-page2. The web portal engine 210 may render the already received information from portlet1 application and may prepare it for sending, 418, to the client-side aggregator 208 for further client-side aggregation and rendering.

This pre-aggregated and pre-rendered portal page may not include the also requested information of portlet2 application 228. Instead, a placeholder may be included in webpage2. This placeholder may make use of microformats as indicated above. The client-side aggregator 208 may detect this placeholder while sending the received incomplete web-page2 for displaying. While displaying the incomplete web-page2, the client-side aggregator 208 may request, 422, the missing information objects via the web portal engine 210 from portlet2 application 228 as indicated by arrow 424. Portlet2 application 228 may respond, 426, with the required mark-ups and information objects, respectively to the web portal engine 210. The web portal engine 210 may inform, 420, in parallel in the usual way the SLA enforcement engine 231. The web portal engine 210 may forward the received information and mark-up from portlet2 application 228 and forward it, 428, to the client-side aggregator 208. The client-side aggregator 208 may then inject, 430, the received information objects and mark-ups of portlet2 application 228 into web-page2 for a complete displaying of the requested web-page2.

As an example for an XML, fragment demonstrating an interrupted server-side aggregations the reader may be referred to following:

```
<html>
  <body>
    <div class="application-container" id="container_one">
      <!-- microformat identifying a portlet application in the page
      markup -->
      <div class="portlet-instance" id="Portlet1">
        <!--  markup that the portlet application "Portlet1"
           contributes to the page -->
        <p>This markup is generated by Portlet1</p>
      </div>
    </div>
    <div class="application-container" id="container_two">
      <!--    microformat signaling    the    client-side   aggregator
           that   the   portlet   application   "Portlet2"   has   to
           be reloaded   -->   <div    class="portlet-instance-
           deferred"id="Portlet2"/>
    </div>
  </body>
</html>
```

Information object from portlet1 application has been aggregated already, while the underlined code fragment refers to the interrupted aggregation from portlet2 application which is in turn activated for client-side aggregation as a skilled person will understand.

In summary, technical elements that may have to be modified compared to the state-of-the-art of a client-side aggregation and rendering comprise a new and modified client-side aggregator adapted for interpreting the placeholders in form of microformats, a new portal engine adapted for sending incomplete web-pages with placeholders, a additional SLA policy engine as well as a new SLA policy repository.

Figure 5:
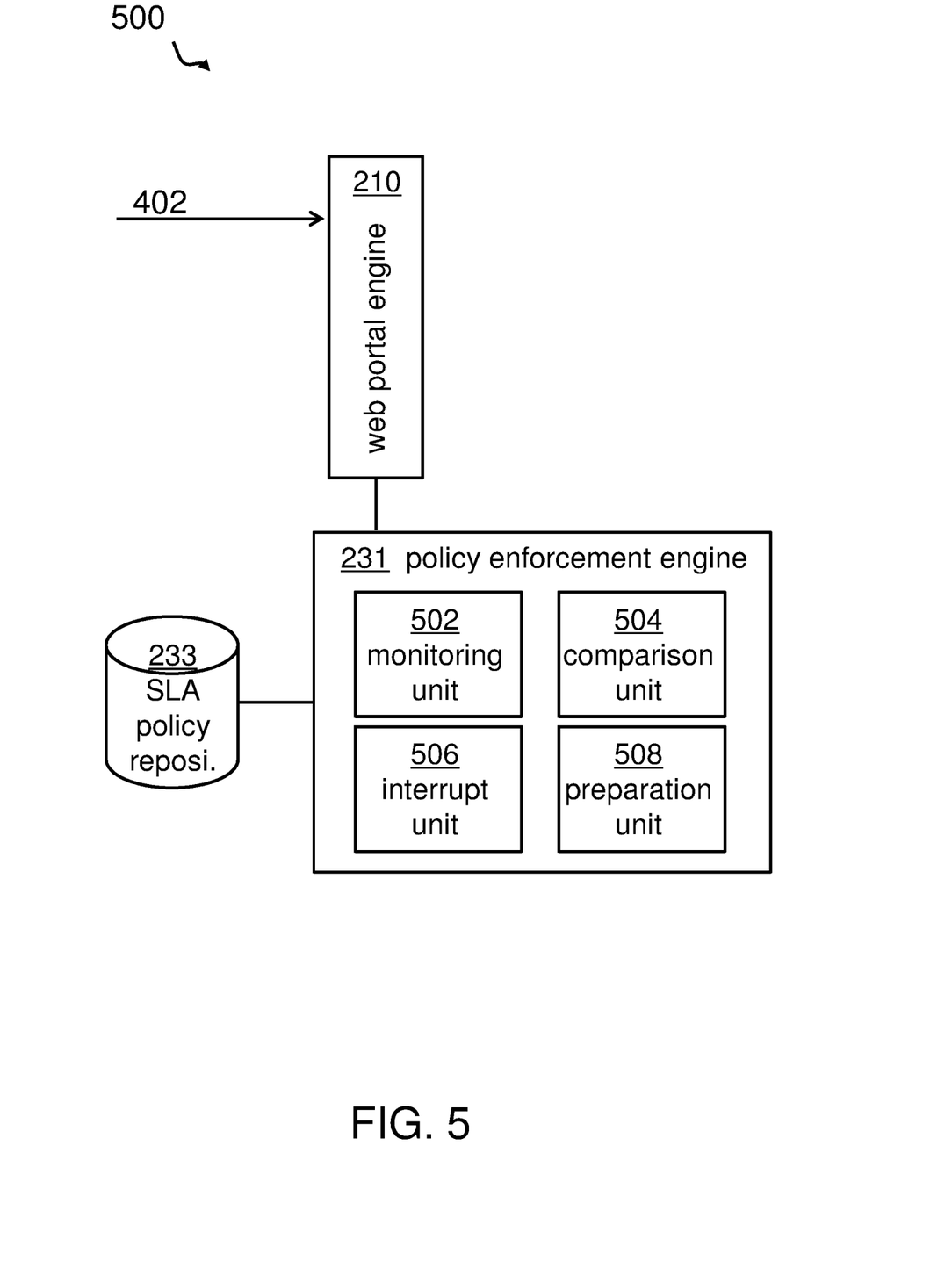
FIG. 5 shows an embodiment of a system for a rendering of a portal page.

FIG. 5 shows an embodiment of a system 500 for a rendering of a portal page. The portal page may be displayable on a client system. The system may comprise a web portal engine 210 adapted for receiving a request 402 for a portal page. The system may as well comprise a policy enforcement engine 231 which may comprise a monitoring unit 502 adapted for monitoring a server-side aggregation and rendering performance, a comparison unit 504 adapted for comparing a measured performance parameter value of the server-side aggregation and rendering against a predefined threshold value, and an interrupt unit 506 adapted for interrupting, based on a result of the comparison unit 504, the server-side aggregation and rendering once the threshold value may be exceeded. Furthermore, the enforcement engine 230 may comprise a preparation unit 508 adapted for preparing an intermediate result of the portal page based on the server-side aggregation and rendering for sending, in particular to the client-side aggregator (not shown) such that a client-side processing may complete the interrupted aggregation and rendering of the portal page. It may be noted that the preparation unit 508 or the complete enforcement engine 230 may be implemented as part of the web portal engine 210.

Figure 6:
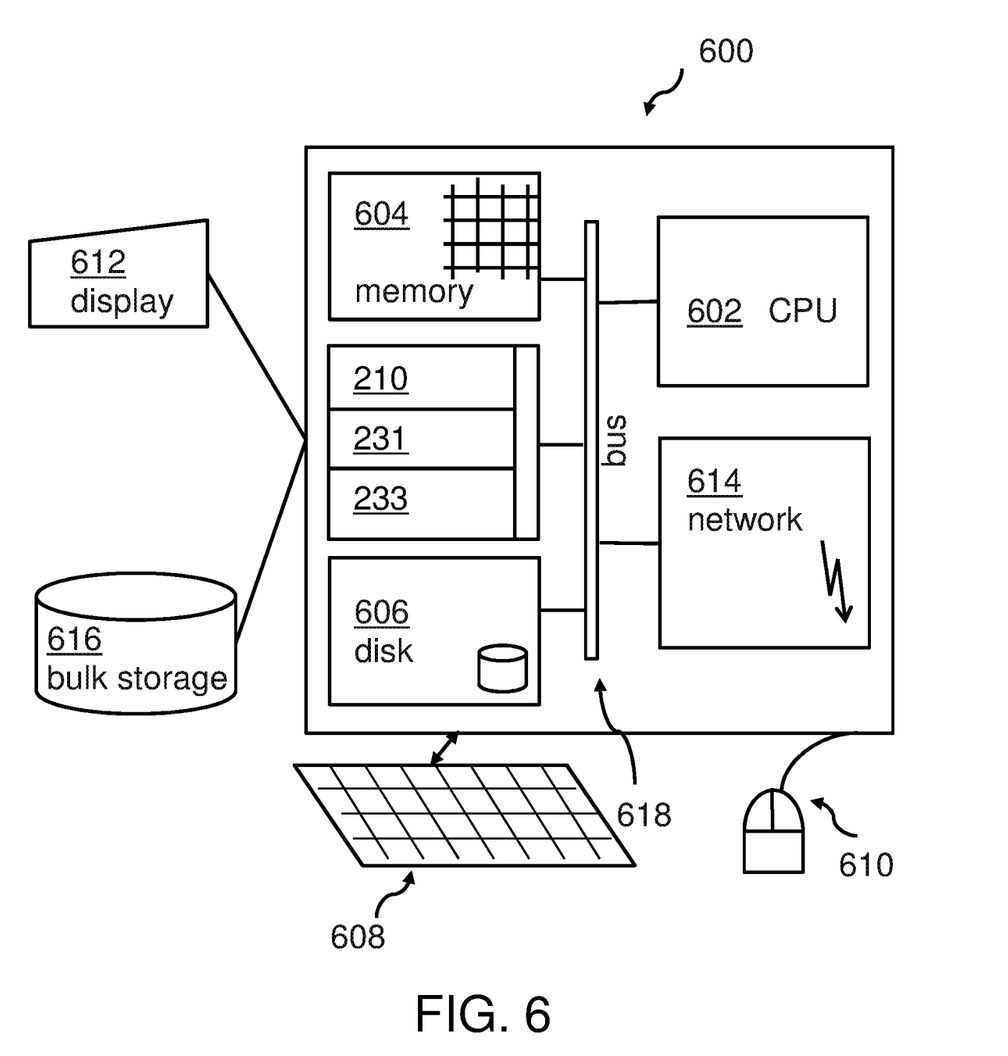
FIG. 6 shows an embodiment of a computing system including elements for performing the method for rendering a portal page.

Embodiments of the invention may be implemented together with virtually any type of computer, regardless of the platform being suitable for storing and/or executing program code. For example, as shown in FIG. 6, a computing system 600 may include one or more processor(s) 602 with one or more cores per processor, associated memory elements 604, an internal storage device 606 (e.g., a hard disk, an optical drive such as a compact disk drive or digital video disk (DVD) drive, a flash memory stick, a solid-state disk, etc.), and numerous other elements and functionalities, typical of today's computers (not shown). The memory elements 604 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 616 for an execution. Elements inside the computer 600 may be linked together by means of a bus system 618 with corresponding adapters. Additionally, system for rendering of a portal page comprising the web portal engine 210, the policy enforcement engine 231 and the policy repository 233 may be attached to the bus system 618. This may apply to a portal server. A similar hardware design may be implemented for the client. In this case, elements 210, 230, 232 may be replaced by the web client-side aggregator.

The computing system 600 may also include input means, such as a keyboard 608, a pointing device such as a mouse 610, or a microphone (not shown). Alternatively, the computing system may be equipped with a touch sensitive screen as main input device. Furthermore, the computer 600, may include output means, such as a monitor or screen 612 [e.g., a liquid crystal display (LCD), a plasma display, a light emitting diode display (LED), or cathode ray tube (CRT) monitor]. The computer system 600 may be connected to a network (e.g., a local area network (LAN), a wide area network (WAN), such as the Internet or any other similar type of network, including wireless networks via a network interface connection 614. This may allow a coupling to other computer systems or a storage network or a tape drive.

Those, skilled in the art will appreciate that many different types of computer systems exist, and the aforementioned input and output means may take other forms. Generally speaking, the computer system 600 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a 'circuit,' 'module' or 'system.' Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method within a client computer that is configured to interact with a portal server, comprising:
    sending, to the portal server, a request for a portal page;
    receiving an intermediate result of the requested portal page; and
    completing rendering of the portal page using the intermediate result, wherein performance of server-side aggregation and rendering of a requested portal page is monitored by the portal server,
    a measured performance parameter value of the server-side aggregation and rendering is compared against a pre-defined threshold value by the portal server, and
    the portal server interrupting the server-side aggregation and rendering, based on a predefined transmission parameter value such that the interrupting occurs after a calculation of a value equivalent to the threshold value minus the pre-defined transmission parameter value is generated.

2. The method of claim 1, wherein
    the measured performance parameter value and the pre-defined threshold value are time-based values.

3. The method of claim 1, wherein
    the intermediate result includes already aggregated and rendered portions of the requested portal page,
    the intermediate result includes a placeholder for at least one of non-aggregated or non-rendered elements of the requested portal page, and
    the placeholder is interpretable by a client-side aggregator and rendering engine.

4. The method of claim 3, wherein
    the placeholder is based on mark-up language elements representing a microformat including an information object.

5. The method of claim 1, wherein
    the threshold value is retrievable from a policy repository using an identifier of the requested portal page as access key.

6. The method of claim 1, wherein
    a plurality of threshold values belong to a class of portal pages.

7. The method of claim 1, wherein
    the server-side aggregation and rendering includes at least one out of the group consisting of a web portal theme, a portlet, and a widget.

8. A client computer that is configured to interact with a server computer, comprising
    a hardware processor programmed to initiate the following executable operations:
        sending, to the portal server, a request for a portal page;
        receiving an intermediate result of the requested portal page; and
        completing rendering of the portal page using the intermediate result, wherein performance of server-side aggregation and rendering of a requested portal page is monitored by the portal server,
        a measured performance parameter value of the server-side aggregation and rendering is compared against a pre-defined threshold value by the portal server, and
        the portal server interrupting the server-side aggregation and rendering, based on a predefined transmission parameter value such that the interrupting occurs after a calculation of a value equivalent to the threshold value minus the pre-defined transmission parameter value is generated.

9. The client computer of claim 8, wherein
    the measured performance parameter value and the pre-defined threshold value are time-based values.

10. The client computer of claim 8, wherein
    the intermediate result includes already aggregated and rendered portions of the requested portal page,
    the intermediate result includes a placeholder for at least one of non-aggregated or non-rendered elements of the requested portal page, and
    the placeholder is interpretable by a client-side aggregator and rendering engine.

11. The client computer of claim 10, wherein
    the placeholder is based on mark-up language elements representing a microformat including an information object.

12. The client computer of claim 8, wherein
    the threshold value is retrievable from a policy repository using an identifier of the requested portal page as access key.

13. The client computer of claim 8, wherein
    a plurality of threshold values belong to a class of portal pages.

14. The client computer of claim 8, wherein
    the server-side aggregation and rendering includes at least one out of the group consisting of a web portal theme, a portlet, and a widget.

15. A computer program product, comprising
    a hardware storage device having program code,
    the program code, which when executed by a client computer configured to interact with a server computer, causes the client computer to perform:
        sending, to the portal server, a request for a portal page;
        receiving an intermediate result of the requested portal page; and
        completing rendering of the portal page using the intermediate result, wherein performance of server-side aggregation and rendering of a requested portal page is monitored by the portal server, a measured performance parameter value of the server-side aggregation and rendering is compared against a pre-defined threshold value by the portal server, and the portal server interrupting the server-side aggregation and rendering, based on a predefined transmission parameter value such that the interrupting occurs after a calculation of a value equivalent to the threshold value minus the pre-defined transmission parameter value is generated.

16. The computer program product of claim 15, wherein the measured performance parameter value and the pre-defined threshold value are time-based values.

17. The computer program product of claim 15, wherein the intermediate result includes already aggregated and rendered portions of the requested portal page, the intermediate result includes a placeholder for at least one of non-aggregated or non-rendered elements of the requested portal page, and the placeholder is interpretable by a client-side aggregator and rendering engine.

18. The computer program product of claim 17, wherein the placeholder is based on mark-up language elements representing a microformat including an information object.

19. The computer program product of claim 15, wherein the threshold value is retrievable from a policy repository using an identifier of the requested portal page as access key.

20. The computer program product of claim 15, wherein a plurality of threshold values belong to a class of portal pages.

* * * * *